Dec. 30, 1924.  
E. B. WHITCOMB  
RECOIL CHECK  
Original Filed April 18, 1919   2 Sheets-Sheet 1  
1,521,583
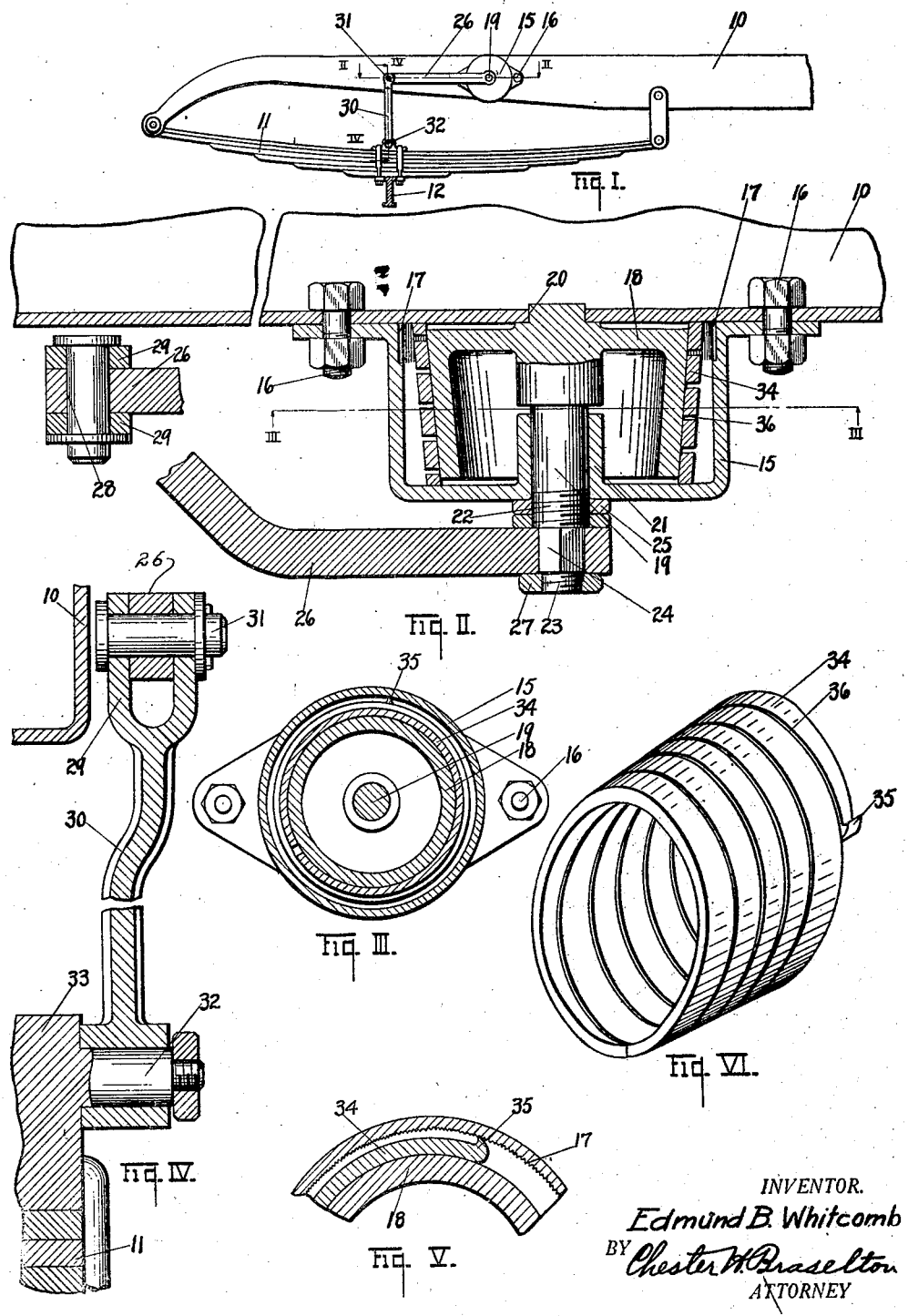
INVENTOR.  
Edmund B. Whitcomb  
BY Chester W. Braselton  
ATTORNEY

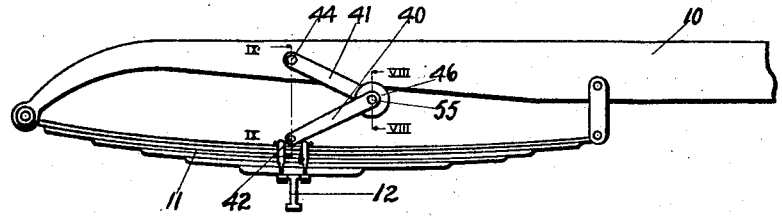
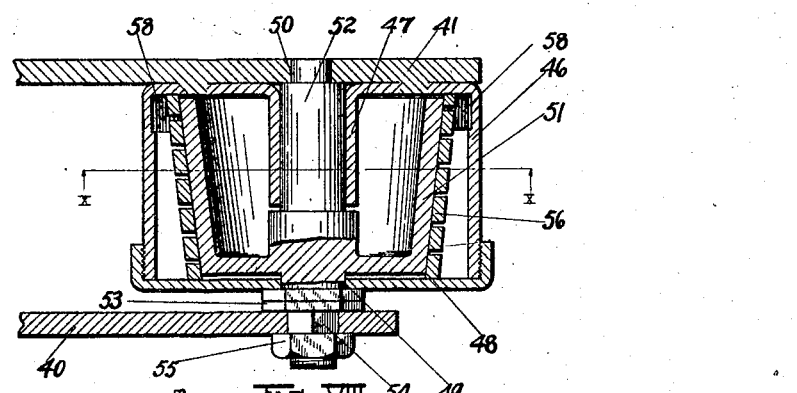
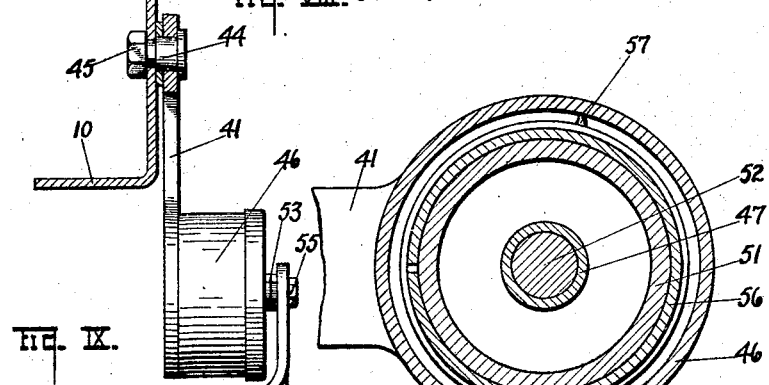
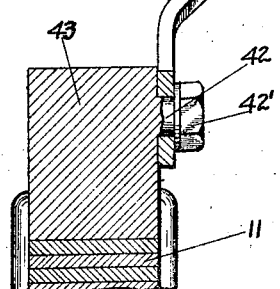

Patented Dec. 30, 1924.

1,521,583

UNITED STATES PATENT OFFICE.

EDMUND B. WHITCOMB, OF BROOKLYN, NEW YORK, ASSIGNOR TO INDUSTRIAL RESEARCH CORPORATION, OF TOLEDO, OHIO, A CORPORATION OF DELAWARE.

RECOIL CHECK.

Application filed April 18, 1919, Serial No. 290,999. Renewed May 26, 1924.

*To all whom it may concern:*

Be it known that I, EDMUND B. WHITCOMB, a citizen of the United States, residing at Brooklyn, county of Kings, and State of New York, have invented certain new and useful Improvements in Recoil Checks, of which I declare the following to be a full, clear, and exact description.

This invention relates to recoil checks, an object of which is to provide a novel type of friction mechanism wherein relatively movable parts move freely in one direction, while their movement in the opposite direction is retarded, further objects of the invention being to provide an improved friction producing means for retarding the relative movement of the movable parts, and an improved operative arrangement of the parts of a recoil check.

The objects of the invention are accomplished in one instance by the devices and means described in the following specification, but it is evident that the same may be varied widely without departing from the scope of the invention, as pointed out in the appended claims. In the accompanying drawings forming a part hereof;

Figure I is a side elevational view of a portion of an automobile frame illustrating one application of one embodiment of the invention.

Figure II is a horizontal sectional view, taken along the line II—II of Figure I.

Figure III is a vertical sectional view taken along the line III—III of Figure II.

Figure IV is a vertical sectional view taken along the line IV—IV of Figure I.

Figure V is an enlarged sectional view illustrating one means for effecting action of operative friction elements, or of the relatively rotatable members.

Figure VI is a perspective view of a coiled friction element.

Figure VII is a side elevational view illustrating a second application of a recoil check of this invention.

Figure VIII is a vertical sectional view, taken along the line VIII—VIII of Figure VII.

Figure IX is a vertical sectional view, taken along the line IX—IX of Figure VII.

Figure X is a vertical sectional view taken along the line X—X of Figure VIII.

The frame member 10 of an automobile, for example, is suspended on a leaf spring 11 supported on an axle 12.

A shock absorber casing 15 of cup-shaped form is firmly secured to the side portion of the frame member 10 by means of bolts 16 or other suitable fastening means. The interior surface of the cup-shaped casing member 15 is provided with a plurality of fine notches 17, located near that portion of the casing which is adapted to contact with the frame member 10 and spaced from each other circumferentially about the inner surface of the casing member. A second cup-shaped member 18 is positioned within the casing 15, being provided with a centrally positioned shaft 19, which extends beyond the end portions thereof and is rotatably mounted in bearings 20 and 21 formed in the frame member and casing respectively. The cup-shaped member 18 is centrally positioned with respect to the interior of the casing 15, and the outer circumferential surface thereof being opposed to the inner circumferential surface of the casing 15, and is in the form of a frustrum of a cone. That portion of the shaft 19 which is rotatably mounted within the bearing 21 is provided at points exteriorly of the bearing 21 with threaded portions 22 and 23, and a squared or angular portion 24. A pair of clamping nuts 25 are threaded upon the portion 22 so as to properly position the member 18 with respect to the casing 15 for a purpose which will be more fully described hereinafter, while an arm 26 provided with a squared or angular opening is adapted to fit upon the squared or angular portion 24 of the shaft, the same being held in place thereon by means of a nut 27 threaded upon the portion 23 of the shaft.

The arm 26 is provided with an opening 28 at its opposite extremity by which the same may be pivotally connected to the forked arms 29 formed upon one end of a link 30 by means of a pin 31. The opposite end of the link 30 is pivoted to a boss 32 carried by the shackle plate 33, which bears against the upper surface of the leaf spring 11 and assists in securing the same to the axle 12.

A coiled friction member 34 of spiral form and having a considerable degree of flexibility is interposed between the cup-shaped member 18 and the cylindrical casing 15 for the purpose of checking rotatable movement of these members with respect to each other in one direction. The spiral friction member 34 is provided at one end thereof with a sharpened lug 35, the sharpened edge of which is adapted to engage with the notches 17 formed upon the interior circumferential face of the casing member 15 under certain conditions to retain the end of the spiral friction member to which the lug 35 is secured in relatively fixed position with respect to the casing member 15, thus permitting the flexible spiral friction member to be wound about the exterior cone-shaped surface of the member 18 for the purpose of frictionally engaging the same and checking the relative movement of the member 18 with respect to the casing 15.

As the axle 12 is displaced upwardly from its normal position, as shown in Figure I, by reason of a jar or vibration occasioned by the vehicle passing over a rough or uneven surface, the link 30 is displaced upwardly, thus tending to rotate the shock absorber arm 26 in a clockwise direction, as viewed in Figure I, and rotating the member 18 secured thereto in a clockwise direction with respect to the interior surface of the casing 15. It is to be understood that the friction element 34 will offer no resistance to the rotation of the member 18 in a clockwise direction with respect to the casing 15, as such movement will tend to uncoil or loosen the various coils of the friction member and thus permit the rotatable member 18 to turn within the same. If any slight degree of friction exists between the inner surface of the friction member and the outer cone-shaped surface of the rotatable member 18, as the member 18 is turned in a clockwise direction, the form of the sharpened lug 35 is such as to permit it to slip slightly over the notches 17 formed in the interior surface of the casing member so as to insure that the rotatable member 18 moves with substantial freedom in a clockwise direction with respect to the casing member 15. When, however, the leaf spring 11 has reached the upward limit of its movement, it will tend to return suddenly to its original position, and the function of the shock absorber shown herewith is to interpose such a resistance to the return movement of the leaf spring as to minimize the vibration imparted to the frame of the automobile. It will be observed that as the leaf spring tends to return to its original position, it will exert a downward pull upon the link 30, thus tending to rotate the shock absorber arm 26 and the rotatable member 18 in a counter-clockwise direction as viewed in Figure I. Immediately upon the rotatable member 18 commencing to rotate in a counter-clockwise direction, it will tend to wind the flexible tension member 34 tightly against the outer cone-shaped surface of the member 18, thus causing frictional resistance to the continued rotation of the member 18 by reason of the friction induced between the outer cone-shaped surface thereof, and the inner surface of the coiled friction member which rests against and bears upon the outer cone-shaped face of the rotatable member. As the member 18 begins to rotate in a counter-clockwise direction with respect to the interior surface of the casing 15, the sharpened lug 35 is brought into closer engagement with the notches 17, and the peculiar shape of the same causes it to firmly grip against one of the notches and thus prevent rotation of the flexible member with respect to the interior surface of the casing. As the coiled member 34 which is made of extremely flexible material, has its interior surface brought into close contact with the exterior cone-shaped surface of the member 18 by means of the rotation of that member, the flexible element firmly grips the cone-shaped surface and winds tightly about the same so as to retard the rotative movement of the member 18 in a counter-clockwise direction. As the flexible friction member is closely wound about the cone-shaped surface, the coils of the friction member are brought closer together, thus diminishing the open spaces there-between and bringing the adjacent edges of the coil into close frictional engagement with each other, which serves as an additional means acting independently of the rotatable member for increasing the frictional resistance to the further movement of the rotatable member, and thus further checking the relative movement between the member 18 and the casing 15. It will be seen that this frictional resistance to the free movement of the rotatable member, caused by the co-operating edges of the coil bearing against each other is exclusive of the frictional resistance occasioned by the inner surface of the coiled friction member bearing against the exterior cone-shaped surface of the member 18. When the spring 11 has been again returned to its lowermost position, having had its return movement retarded by means of the checking action of the shock absorber, and is again urged in an upward direction by reason of further vibrations, thus tending to rotate the member 18 in a clockwise direction with respect to the casing 15, the initial turning movement of the member 18 in a clockwise direction tends to immediately release the coils of the flexible friction element from clamping against the exterior cone-shaped surface thereof, thus permitting the member 18 to rotate readily in a clockwise direction without the interposition of any frictional retarding force in its free direction. It will be observed that the member 18 is capable of slight movement in a direction longitudinally of its axis within the casing 15, and the member 18 is capable of being adjusted in that direction so as to compensate for wear upon the exterior cone-shaped surface thereof, so as to enable it to properly grip against the interior surface of the coiled flexible element 34 at all times. The manner of adjusting the element 18 is as follows: The shaft 19 is axially movable within its bearings 20 and 21 and the nuts 25 for locking the same in adjusted position are threaded upon the portion 22 a sufficient distance so that the inner nut 25 bears against the exterior face of the casing 15 while the outer nut 25 is clamped firmly against the exterior face of the inner nut for the purpose of firmly locking the same in position and retaining the shaft against longitudinal movement in one direction. Movement of the shaft 19 in the opposite direction is prevented as such movement is opposed by the coiled friction element 34 bearing against the exterior cone-shaped surface of the member 18 carried by the shaft.

In the modified form of the invention illustrated in Figures VII to X inclusive, the relatively movable elements of the shock absorber are connected to the spring and frame portions of the automobile by arms 40 and 41 respectively. The end of the arm 40 is pivotally mounted upon a boss 42 carried by the shackle plate 43 and is secured in place thereon by means of a nut 42'; the end of the arm 41 is pivotally mounted in a similar manner upon its pivot bolt 44 attached to the frame portion 10 and secured in place thereon by means of a nut 45. The opposite end of the arm 41 has secured thereto in a suitable manner, as by being spot welded, a cup-shaped casing member 46 which is provided with a central opening, and an inturned flange 47 surrounding the same. The casing member 46, which is secured to the end of the arm 41 as previously described, is provided with a cover 48, which is adapted to be threaded in such a manner as to close that portion of the casing which is farthest removed from the arm 41. The cover 48 is provided with a central opening 49 so positioned as to register with the central opening of the casing and an opening 50 formed in the arm 41. A cup-shaped member 51 is positioned within the casing 46, and is provided with a centrally positioned shaft 52 preferably formed integral therewith and rotatably mounted within the central bearings formed by the inturned flange 47, and the central opening 49 in such a manner that the outer cone-shaped surface of the member is substantially centrally positioned with respect to the inner circumferential surface of the casing member 46. The rotatable member 51 is capable of adjustment in the direction of its longitudinal axis in a manner similar to that in which the cup-shaped member 18 previously described is adjustable, and is capable of being locked in various positions of adjustment by means of a pair of locking nuts 53. The shaft 52 is provided with a squared or angular portion 54 upon which one end of the arm 40 fits in such a manner as to be non-rotatably connected with the cup-shaped member 51. The arm 40 is firmly secured in position upon the angular portion 54 of the shaft 52 by means of a nut 55. A coiled flexible friction element 56 is positioned upon the exterior cone-shaped surface of the member 51 and operates for the purpose of checking rotative movement of the member 51 with respect to the casing member 46 in a similar manner to that in which the coiled friction element 34 operates in the modification illustrated in Figures I to VI inclusive. The flexible friction element 56 is provided at one extremity with a sharpened lug 57, similar to the sharpened lug 35 formed on the flexible element 34, and which co-operates with a plurality of notches 58 formed upon the inner circumferential surface of the casing element 46.

The manner of operation of the mechanism comprising the structure illustrated in Figures VII to X inclusive is similar in all respects to the method of operation of the structure previously described. The shock absorber serves to retard or check the speed with which the axle 12 is adapted to rebound to its original position after having been forced into proximity with the frame by reason of a jar caused by the automobile passing over an uneven surface. The rotation of the member 51 with respect to the casing member 46 in a counter-clockwise direction is retarded by the gripping of the interior surface of the flexible member upon the outer cone-shaped surface of the rotatable member 51, and by the friction exerted between the adjacent edge surfaces of the spirals when they are brought into contact with each other by being wound tightly upon the outer cone-shaped surface of the rotatable member 51.

As previously stated the rotatable member 51 is capable of adjustment in a direction longitudinally of its axis, in a manner similar to that in which the rotatable member 18 previously described is adjustable, for the purpose of compensating for wear between the outer cone-shaped surface of the rotatable member and the inner surface of the coiled flexible element 56 which bears there-against.

While I have shown and described in considerable detail a specific embodiment of my invention, it is to be understood that this showing and description is illustrative only, and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In a device of the class described, relatively movable members, one of which is provided with a conical surface, a spiral friction element adapted to engage the conical surface of the one member and having means, normally detached, on one end adapted to engage with the other relatively movable member for the purpose of retarding the relative movement of the members in one direction.

2. In a device of the class described, relatively rotatable members having telescoping portions, a coiled friction element free at one end and engaging at the other end with one of the rotatable members but normally detached therefrom and positioned intermediate the telescoping portions in such a manner as to coil about the telescoping portion of the other rotatable member for checking the relatively rotatable movement of the members in one direction.

3. In a mechanism having members relatively movable about a common axis, an element normally coiled on one of said members, normally detached from but adapted to engage one end of said element, and holding means upon the other of said members for one end only of said element, whereby it tightens its coils upon the first of said members during relative movement of said members in one direction only.

4. In a device of the class described, concentrically mounted, relatively rotatable members having telescoping portions, a coiled friction element adapted to engage the surface of one of said rotatable members, the other of said rotatable members having means for engaging one end of the coiled friction element during the relative motion of said members in one direction, said means being adapted to release said end of said friction element upon the initial movement of said members in the opposite direction.

5. In a device of the class described, a pair of relatively rotatable members, one of which is provided with a conical surface, a spiral friction element wound upon and shaped substantially to fit said conical surface, means upon the other rotatable member for retaining one end of said friction element, and means for adjusting said conical member and friction element axially relative to each other to regulate the amount of friction therebetween.

In testimony whereof, I affix my signature.

EDMUND B. WHITCOMB.